United States Patent Office

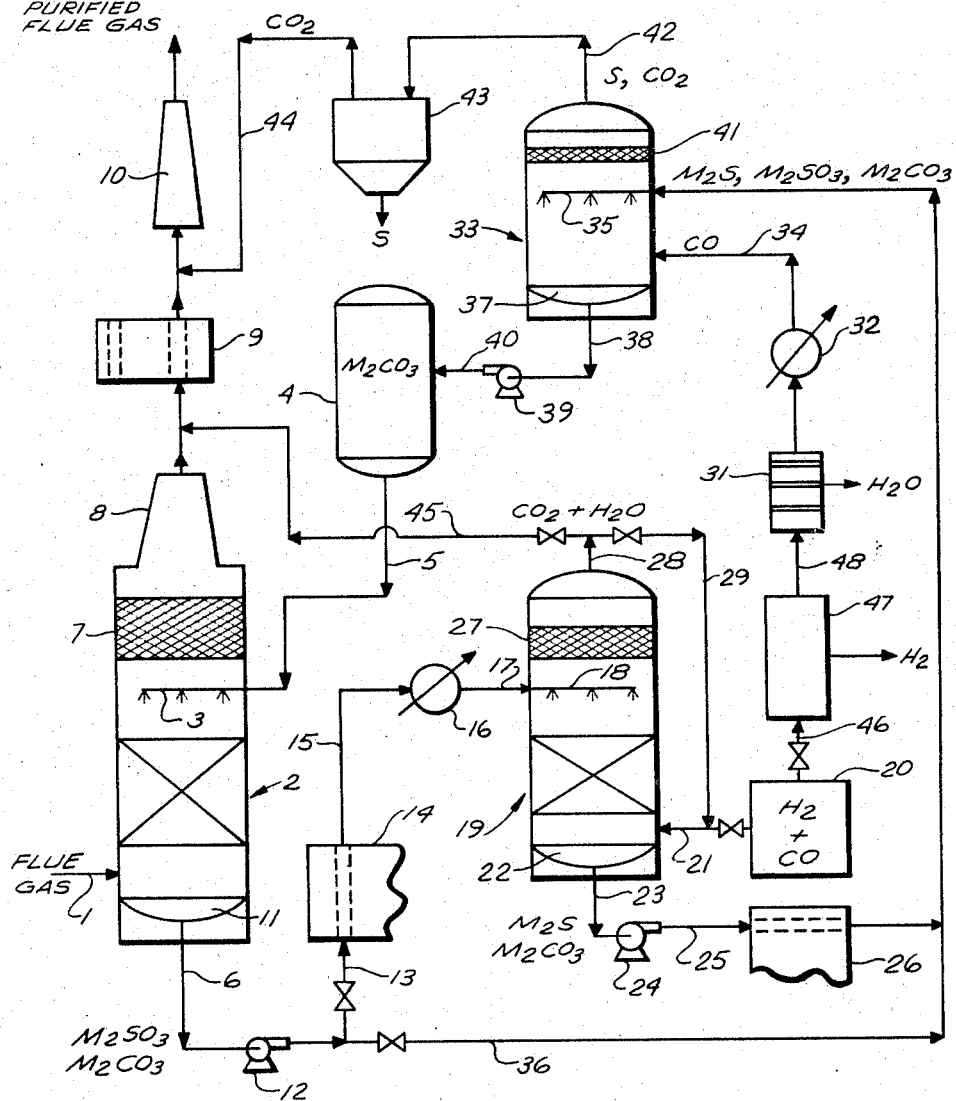

3,438,734
Patented Apr. 15, 1969

3,438,734
SULFUR PRODUCTION USING CARBON OXIDE REGENERANT
Le Roy F. Grantham, Calabasas, Calif., assignor to North American Rockwell Corporation, a corporation of Delaware
Filed May 15, 1967, Ser. No. 638,530
Int. Cl. C01b 17/02
U.S. Cl. 23—224                                                                7 Claims

ABSTRACT OF THE DISCLOSURE

A method for removing sulfur dioxide from flue gas and recovering it as sulfur by (1) absorption of the sulfur dioxide in a molten salt mixture containing alkali metal carbonate to form alkali metal sulfite, (2) reduction of alkali metal sulfite by treatment with a reducing agent to form alkali metal sulfide, and (3) treatment of the alkali metal sulfide with alkali metal sulfite and a gaseous mixture containing carbon monoxide, carbon dioxide, or carbon monoxide-carbon dioxide to regenerate the alkali metal carbonate absorbent and form elemental sulfur.

CROSS REFERENCES TO RELATED APPLICATIONS

The method for removing sulfur dioxide from flue gas by absorption of the sulfur dioxide in a molten alkali metal carbonate mixture to provide the feedstock for the two-stage regeneration process of the present invention wherein the sulfur dioxide is recovered as elemental sulfur is described in patent application S.N. 638,528, filed May 15, 1967 and assigned to the assignee of the present invention.

Other regeneration processes that may also be utilized for treatment of the resultant absorbent solution provided by the process described in S.N. 638,528 are described in the following patent applications, all filed May 15, 1967 and assigned to the assignee of the present invention: Two-Stage Regeneration of Absorbent for Sulfur Oxides (S.N. 638,529); Absorbent Regeneration Using Carbon Regenerant (S.N. 638,365); Sulfur Production Using Carbon Regenerant (S.N. 638,366); and Electrochemical Method for Recovery of Sulfur Oxides (S.N. 638,364).

BACKGROUND OF THE INVENTION

This invention relates to a process for the removal of sulfur compounds from hot combustion gases and their recovery as elemental sulfur. It particularly relates to a process wherein the sulfur dioxide content of a flue gas is removed by absorption in a molten alkali metal carbonate-containing solution, and the absorbent is regenerated by a two-stage regeneration process comprising the sequential steps of reduction and reformation, and the sulfur values are recovered from the resultant absorbent solution directly in the form of elemental sulfur.

Sulfur oxides, principally as sulfur dioxide, are present in the waste gases discharged from many metal refining and chemical plants and in the flue gases from power plants generating electricity by the combustion of fossil fuels. The control of air pollution resulting from this discharge of sulfur oxides into the atmosphere has become increasingly urgent. An additional incentive for the removal of sulfur oxides from waste gases is the recovery of sulfur values otherwise lost by discharge to the atmosphere. However, particularly with respect to the flue gases from power plants, which based on the combustion of an average coal may contain as much as 3000 p.p.m. sulfur dioxide and 30 p.p.m. sulfur trioxide by volume, the large volumes of these flue gases relative to the quantity of sulfur which they contain make removal of the sulfur compounds from these gases expensive. Also, while the possible by-products, such as elemental sulfur and sulfuric acid, that may be ultimately obtained from the recoverable sulfur values have virtually unlimited markets as basic raw materials, they sell for relatively low figures. Consequently, low-cost recovery processes are required.

Many processes have been proposed and investigated for the desulfurization of flue gases. In a typical wet absorption process, the flue gas is washed with an alkaline aqueous solution or slurry. Thus the use of an aqueous slurry of calcium hydroxide or calcium carbonate has been investigated in several British power plants. In other wet processes, aqueous ammonia or aqueous sodium sulfite solutions have been utilized as washing fluids. While these wet processes have some advantageous features, they all suffer from the common drawback of the flue gas being cooled substantially and becoming saturated with water vapor in the absorption tower. This cooling of the gas decreases the overall efficiency of the process because of the additional power requirements for dispersal of the flue gas to the atmosphere. Further, the associated condensation and precipitation of evaporated water containing contaminants in the surrounding environment creates substantial problems.

In the dry processes using solid adsorbents, sulfur dioxide is removed either by chemical reaction with the adsorbent or by adsorption followed by oxidation of the adsorbed sulfur dioxide. In one such process shown in U.S. Patent 2,718,453, finely powdered calcium carbonate is blown into the combustion gas to form calcium sulfate or calcium sulfite. In general a reaction between a solid and gas is relatively slow and inefficient, being limited to the available surface area of the solid. Also, the resultant products do not readily lend themselves to regeneration of the starting carbonate material or recovery of the removed sulfur values.

In a regenerative dry process, the flue gas is contacted with activated lignite char at about 200° C., sulfur dioxide being adsorbed and converted immediately by the oxygen and water present in the flue gas to sulfuric acid. The char is regenerated by heating at about 400° C. to yield a desorbed gas of high sulfur dioxide content. In another dry process, pellets of alkalized alumina are used as adsorbent to remove sulfur dioxide. Undesirably, this adsorbed material is oxidized to sodium sulfate by the catalytic action of the alkalized alumina. The saturated adsorbent is regenerated by heating it at 600° C. with a reducing gas. The solid adsorbent processes are disadvantageous in being surface area limited and further because of the difficulties involved in the handling and moving of large quantities of the solid adsorbent which would be required in large-scale process applications.

In a catalytic oxidation process, sulfur dioxide is converted to sulfur trioxide at a temperature of about 400–430° C. by catalytic oxidation using alumina-supported platinum or vanadia catalysts, followed by hydration to sulfuric acid. While the concept of direct oxidation is potentially attractive, very extensive prior purification of the flue gases is required to avoid poisoning of the catalyst and contamination of the produced sulfuric acid. Also, the resultant 70 wt. percent sulfuric acid produced in such a process is very corrosive at the condensation temperature involved and therefore requires the use of very large and expensive corrosion-resistant equipment. Further, sulfuric acid of this concentration has a very limited market.

SUMMARY OF THE INVENTION

It is an object of the present invention to provide a highly efficient method for the absorption of sulfur dioxide and sulfur trioxide from the flue gases using inexpensive, readily available materials and avoiding the use of expensive equipment. In addition to the absorption stage, the process includes two-stage regeneration for regenerating the absorbent and for directly recovering the sulfur values as elemental sulfur without prior conversion to hydrogen sulfide gas.

In accordance with this invention, a sulfur removal process is provided comprising the separate sequential steps of absorption, reduction, and reformation. The two sequential steps of reduction and reformation are designated as a two-stage regeneration of the sulfur-containing absorbent solution resulting from the absorption stage. The present process is directed to an improvement in the reformation step of the two-stage regeneration so that the sulfur values are recovered as elemental sulfur without prior recovery of hydrogen sulfide gas.

The absorption stage per se is described and claimed in S.N. 638,528, and the reduction steps that may be used with two-stage regeneration are shown in S.N. 638,529 and S.N. 638,365, these three copending applications being incorporated herein by reference, and they should be consulted for fuller details of the absorption stage and of the reduction step of two-stage regeneration, respectively.

In the absorption stage, described and claimed in copending application S.N. 638,528, sulfur oxides present in a hot combustion gas generally produced by burning a sulfur-containing hydrocarbon or fossil fuel are removed from the combustion gas by contacting the gas at a temperature of at least 350° C., with a molten salt mixture containing alkali metal carbonates ($M_2CO_3$) as active absorbent to thereby remove the sulfur oxides. The melting temperature of the salt mixture is preferably between 350 and 450° C. The resultant sulfur compound that is formed consists principally of alkali metal sulfite, derived from the sulfur dioxide, and may also contain alkali metal sulfate, derived from the $SO_3$ initially present or formed by oxidation of a portion of the formed sulfite.

Two-stage regeneration, which follows the absorption stage, consists of the steps of reduction and reformation. A reduction step is described in copending application S.N. 638,529 in which the resultant molten absorbent solution obtained from the absorption stage and containing the absorbed sulfur values, principally as alkali metal sulfite, is treated at a temperature between 400 and 700° C., preferably between 600 and 650° C. under reaction conditions favoring formation of alkali metal sulfide, with a reductant gas mixture containing as principal active reducing agent hydrogen, carbon monoxide, or a mixture thereof to convert the absorbed sulfur values principally to alkali metal sulfide in the molten salt. In a two-stage regeneration process shown in copending application S.N. 638,365, the resultant molten absorbent solution is treated, in a first reduction step, with a carbonaceous material providing reactive carbon to similarly convert the absorbed sulfur values principally to alkali metal sulfide in the molten salt. For both of these reduction processes, a reformation step follows in which the alkali metal sulfide-containing molten salt is treated with a gaseous mixture containing steam and carbon dioxide, at a temperature below 450° C. at which the salt preferably is molten, to reform or regenerate the alkali metal carbonate and convert the alkali metal sulfide to hydrogen sulfide gas. This hydrogen sulfide gas is then used as a feedstock for conversion to sulfur or sulfuric acid.

Where sulfur is desired as the ultimate product, the present process provides an improvement in the reformation step whereby the alkali metal sulfide resulting from the reduction step may be directly converted to elemental sulfur without prior formation of hydrogen sulfide gas. The reformation step provided by the present invention involves treatment of the sulfide-containing molten salt with unreacted alkali metal sulfite obtained from the absorption step together with the addition of carbon dioxide, carbon monoxide, or $CO_2$—$CO$ in accordance with the following exemplary equations:

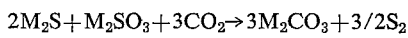
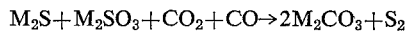

where M denotes a ternary mixture of Li, Na, K, exceess $M_2CO_3$ molten salt being used as carrier solvent. The reformation reaction is performed at a temperature below 500° C. at which the salt preferably is molten, suitably between 325 and 500° C. where other diluent salts are present in addition to the alkali metal carbonate salts which serve to lower the melting temperature of the melt. A temperature between 400 and 450° C. is preferred and is particularly desirable where only the ternary alkali metal carbonate salt is present as carrier solvent.

BRIEF DESCRIPTION OF THE DRAWING

FIG. 2 shows a schematic flow diagram illustrating absorption and two-stage regeneration wherein a carbon monoxide-containing gas is used for the reformation step, both embodiments being directed to the treatment of hot combustion gases obtained by the burning of a sulfur-containing fossil fuel in an electric generating plant.

DESCRIPTION OF THE PREFERRED EMBODIMENTS

Figure 1:
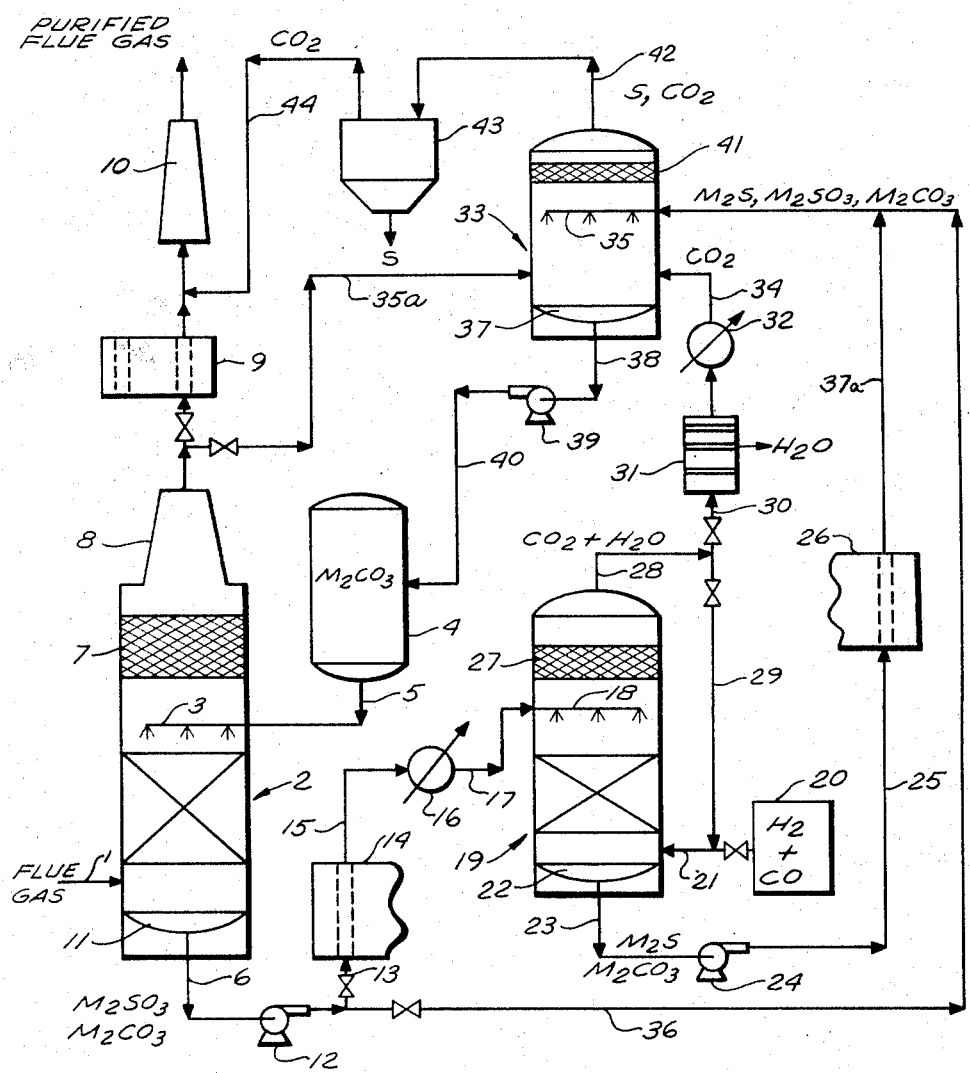
FIG. 1 shows a schematic flow diagram illustrating absorption and two-stage regeneration wherein a carbon dioxide-containing gas is used for the reformation step.

The present invention is broadly directed to an improvement in the reformation step of two-stage regeneration used for treating the absorbent solution obtained by absorption of sulfur dioxides in a molten salt mixture containing alkali metal carbonates as reactive absorbent. The absorption stage per se is described and claimed in S.N. 638,528, which is incorporated herein by reference, and the foregoing copending application should be consulted for fuller details of the absorption stage of this process. In the absorption stage, sulfur oxides present in a hot combustion gas generally produced by burning a sulfur-containing hydrocarbon fuel are removed from the combustion gas by contacting the gas at a temperature of at least 350° C. with a molten salt mixture containing alkali metal carbonates as active absorbent to thereby remove the sulfur oxides. In a preferred aspect of practicing the absorption stage, the combustion gas is treated with a molten ternary salt mixture of the carbonates of lithium, sodium, and potassium, molten at 400° C., to convert the $SO_2$ present to alkali metal sulfite according to the following equation:

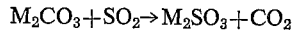

where M denotes a ternary mixture of Li, Na, K, excess $M_2CO_3$ molten salt being used as carrier solvent. Suitably this preferred reaction is performed at a temperature between 395 and 600° C. and particularly between 400 and 450° C., approximately corresponding to the temperature of a typical power plant flue gas.

The present invention will be particularly illustrated with respect to the removal of sulfur oxides from hot combustion gases obtained by the burning of sulfur-containing fossil fuels, particularly in electric generating plants. The absorption stage and the reduction step of two-stage regeneration for both embodiments of the invention will be essentially similar, and similar numbers will be used for both FIGS. 1 and 2 for corresponding parts in the absorption stage and in the reduction step.

Referring to both FIGS. 1 and 2 of the drawing, a flue gas obtained from the combustion of a sulfur-containing coal at a temperature of about 425±25° C. is admitted by way of a conduit 1 to an absorber unit 2. For a typical 1000-mw.(e) coal-fired electric utility plant utilizing coal containing 3 wt. percent sulfur, about 4,650,000 cubic ft./min. flue gas with an $SO_2$ content of about 0.18 vol. percent is generated. The flue gas is passed through a fly ash precipitator (not shown) to remove fine particles entrained therein, prior to entry into the absorber. For a 1000-mw.(e) plant, absorber unit 2 ordinarily consists of five stainless steel cyclone spray towers in parallel arrangement. These towers are suitably insulated with about 5 inches of high temperature insulation so that the temperature drop within them is less than five degrees centigrade.

The flue gas enters tangentially at the base of absorber 2 and travels upwardly with a velocity of about 20 ft./sec. It is contacted countercurrently by a spray of molten carbonate (M.P. about 400° C.) which is discharged through a spray distributor 3 located about 15 ft. above the base of the absorber tower. The molten carbonate salt is contained in a storage vessel 4, which is suitably insulated and equipped with heaters so as to maintain the carbonate salt in a molten state. The molten salt leaves vessel 4 by way of a conduit 5 connected to spray distributor 3 at a flow rate adjusted to provide about 10–30 mole percent sulfite content in the effluent molten salt stream leaving the bottom of absorber 2 by way of a conduit 6.

Because of the rapidity of the chemical reaction between the molten carbonate and the gaseous sulfur dioxide to form alkali metal sulfite, a gas residence time of less than a second is sufficient for a spray height of 15 feet. In addition to the chemical reaction requirements, the flow rate of the flue gas is also determined by the need for minimizing entrainment and pressure drop in the absorber as well as by the spray distribution pattern of the molten carbonate. Any of various well-known contact methods and equipment may be used to insure rapid reaction between the gaseous sulfur dioxide and the molten liquid carbonate such as use of wet-wall contactors or packed columns or absorbers containing perforated plates or bubble-cap trays. However, the spray technique is generally preferred because of its relative simplicity and efficiency.

After contacting the molten carbonate spray, the desulfurized flue gas flows past distributor 3 into a wire demister 7, which is about 1 foot thick and located in the upper section of the absorber tower about two feet above the distributor. The demister serves to remove entrained salt-containing droplets from the flue gas, which is then passed through a conical transition section 8 to minimize pressure drops in the absorber tower and then through a plurality of heat exchangers 9, from which it emerges at a temperature of about 150° C. Heat exchangers 9 may serve as preheaters for the water and the air used in the generating plant. The cooled flue gas from heat exchangers 9 is discharged to the atmosphere through a power plant stack 10. Conventional power plant stacks are 400 to 800 feet high so that mixing in the atmosphere will considerably reduce the ground level concentration of the sulfur dioxide ordinarily present in the emitted stack gases. Since the present process is capable of eliminating 99.9 vol. percent of the sulfur dioxide content of the flue gas, the resultant ground level concentration of sulfur dioxide under ideal conditions is virtually nonexistent, i.e., less than 1 part per billion.

The molten mixture of alkali metal carbonates in vessel 4 serves as the active absorbent. Where the melt consists essentially of only the alkali metal carbonates, a ternary mixture consisting of potassium carbonate, lithium carbonate, and sodium carbonate is utilized having a melting point between 400 and 600° C. A mixture containing approximately equal amounts by weight of the carbonates of potassium, lithium, and sodium has a melting point of about 395° C., about that of the eutectic composition. Since the low melting region around the eutectic temperature is quite broad, a relatively large variation in composition (±5 mole percent) does not change the melting point markedly. Thus, a suitable ternary eutectic composition range, in mole percent, consists of 45±5 lithium carbonate, 30±5 sodium carbonate, and 25±5 potassium carbonate.

Data for the free energy of reaction between $SO_2$ and $M_2CO_3$ to form $M_2SO_3$ show that thermodynamically this reaction is favored at lower temperatures. Therefore, the absorption of $SO_2$ is preferably carried out at temperatures as close to the melting point of the mixed carbonate eutectic as is feasible from plant operating considerations. Further, in order to minimize equipment corrosion and economize on fuel costs, it is additionally preferred to utilize a molten carbonate-containing mixture having as low a melting point as feasible.

Other nonreactive molten salts may be combined with the alkali metal carbonates to serve as inexpensive diluents or to lower the temperature. For example, a lithium-potassium salt mixture containing chloride, sulfite, and carbonate is molten at a temperature of 325° C. Where such diluent salts are utilized, either a single alkali metal carbonate or a binary or ternary mixture of the alkali metal carbonates is combined therewith, the final mixture containing two or more alkali metal cations. In such a system as little as 2 mole percent of alkali metal carbonate may be present with the remaining 98 mole percent being an inert diluent carrier, although at least 5–10 mole percent of alkali metal carbonate is preferable. Illustrative of such a suitable mixture is one utilizing LiCl-KCl eutectic (M.P. 358° C.) wherein the starting salt ratio consists of 64.8 mole percent LiCl and 35.2 mole percent KCl. An absorbent molten mixture containing 90 mole percent of the LiCl-KCl eutectic and 10 mole percent of a corresponding molar ratio of potassium and lithium carbonates has a melting point of about 375° C. Suitable chloride-carbonate molten salt mixtures contain, in mole percent, 15–60 $K^+$, 40–85 $Li^+$, and 0–20 $Na^+$ as cations and 10–98 $Cl^-$ and 2–90 $CO_3^=$ as anions.

Although the melting points of the pure alkali metal sulfites and sulfides are considerably higher than those of the mixed alkali metal carbonates, if a sulfite or sulfide is substituted for only a portion of the carbonate the melting point is lowered, thereby making feasible the circulation of sulfite-containing carbonate melt without the need for additional heat input to keep the circulated salt molten, which would be required were sulfite obtained alone as the reaction product. An alkali metal sulfite content of 10–30 mole percent of the molten salt is preferred.

The molten sulfite-containing carbonate resulting from the rapid reaction between the molten carbonate spray and the flue gas is collected in a dished-bottom heated sump 11 of absorber 2. About a 70 mole percent excess of unreacted carbonate is maintained to serve as a solvent for the sulfite formed by the reaction. The sulfite-carbonate mixture is pumped from sump 11 of absorber 2 through conduit 6 by way of a pump 12, then through a conduit 13 to a heat exchanger 14. The sulfite-carbonate mixture entering heat exchanger 14 is at a temperature of about 425±25° C. The mixture leaves heat exchanger 14, increased in temperature, by way of a conduit 15 and passes through a heater 16, which is optionally utilized for further increasing the temperature of the mixture, where required, to about 625±25° C. The mixture leaves heater 16 through a conduit 17 where it is fed into a spray distributor 18 in a reducer unit 19. Other gas-liquid contact techniques similar to those usable for absorber unit 2 may also be used for the two-stage regeneration reaction.

The chemical reaction in reducer unit 19 involves reduction of the alkali metal sulfite to alkali metal sulfide by treatment of the alkali metal sulfite-carbonate melt under reducing conditions. In the two-stage regeneration process shown in copending application S.N. 638,365, for the reduction step the sulfite-carbonate melt is treated with a carbonaceous material effectively providing reactive carbon as a reductant, preferably in solid or liquid form so as to provide maximum contact, and preferably in the form of active carbon because of its fine porosity and high surface area, the reduction reaction proceeding in accordance with the following equation:

$$2M_2SO_3 + 3C \rightarrow 2M_2S + 3CO_2$$

Temperatures between 450 and 550° C. are principally utilized and preferred. Reaction conditions are selected so as to favor the foregoing principal reaction and minimize the effects of competing side reactions. The use of carbon as a reducing agent is advantageous in that the resultant gas formed consists principally of carbon dioxide, with little or no water present. Thus this formed gas may be used directly for the following reformation step without need for prior removal of water, which could be required for reductants yielding water as a reaction product.

In copending application S.N. 638,529 is described the reduction of the sulfite-carbonate melt using a gaseous mixture containing as active reducing agent hydrogen, carbon monoxide, or a mixture thereof in accordance with the following equations:

$$M_2SO_3 + 3H_2 \rightarrow M_2S + 3H_2O \uparrow$$
$$M_2SO_3 + 3CO \rightarrow M_2S + 3CO_2 \uparrow$$
$$2M_2SO_3 + 3H_2 + 3CO \rightarrow 2M_2S + 3CO_2 \uparrow + 3H_2O$$

Reaction parameters are selected so as to favor the foregoing principal reactions and minimize the effects of competing side reactions. Higher temperatures, preferably between 600 and 650° C., favor the principal reactions, as does rapid removal of evolved gases. From the point of view of process economics, there is preferably utilized as reductant a gaseous mixture of hydrogen and carbon monoxide as ordinarily obtained from a synthesis gas plant as a water gas, producer gas, coal gas, or carburated water gas. The process of the present invention will therefore be described with respect to the use of such a mixture of hydrogen and carbon monoxide for the reduction step.

Referring now to FIG. 1, and considering the reduction step, a reductant gas mixture containing hydrogen and carbon monoxide provided by a synthesis gas plant 20 enters the base of reducer 19 by way of a conduit 21. The molten sulfite-carbonate mixture sprayed from distributor 18 reacts with the reductant gas, the sulfite being reduced to sulfide. The molten alkali metal sulfide-carbonate is collected in a sump 22 at the base of reducer 19. The sulfide-carbonate mixture is pumped from sump 22 through a conduit 23 by way of a pump 24, then through a conduit 25 to a heat exchanger 26 where it loses heat. Heat exchangers 14 and 26 are ordinarily part of the same heat exchanging unit, but have been shown as separate units in the schematic diagram for clarity of illustration.

The gas mixture produced in the reduction reaction with synthesis gas consists principally of carbon dioxide and steam in accordance with the previously shown equation, and will also contain minor amounts of other gaseous components as well as excess unreacted amounts of reducing gas. The relative proportions of carbon dioxide and steam present will depend upon the relative proportions of hydrogen and carbon monoxide utilized in the reductant gas, excess hydrogen favoring the production of steam, excess carbon monoxide favoring the production of carbon dioxide. The resultant gas mixture passes through a demister 27, which removes entrained liquid particles therefrom, the gas then leaving reducer 19 by way of a conduit 28. Where the gas mixture leaving reducer 19 by way of conduit 28 contains substantial amounts of unreacted hydrogen and carbon monoxide, along with formed carbon dioxide and steam, the mixture may be returned to reducer 19 for recycle in the reduction step by way of valved conduits 29 and 21.

For the reformation or regeneration step, the regenerant gas mixture of carbon dioxide and steam leaving reducer 19 by way of conduit 28 is fed by way of valved conduit 30 through a condenser-desorber unit 31, in which it is cooled to remove the water from the gas mixture, the resultant carbon dioxide gas passing through a heater 32 and entering the base of regenerator unit 33 by way of a conduit 34 at a temperature of 425±25° C. Where required, additional amounts of carbon dioxide from which the water has been removed may be fed to regenerator unit 33 from absorber unit 2 by way of a valved conduit 35a.

The molten salt mixture sprayed from a distributor 35 in regenerator unit 33 consists essentially of a mixture of alkali metal sulfide, alkali metal sulfite, and excess alkali metal carbonate. The alkali metal sulfite in molten alkali metal carbonate is fed to regenerator unit 33 from absorber 2 by way of a valved conduit 36. The alkali metal sulfite from conduit 36 and alkali metal sulfide from a conduit 37a leaving heat exchanger 26, both dissolved in excess carbonate, are mixed together in desired proportions prior to entry into regenerator unit 33. The reformation reaction is favored at lower temperatures, below 500° C., at which the melt is in a molten state. Where only sulfide, sulfite, and carbonate is present in the melt, a temperature range of 395–500° C. is suitable, a range of 400–450° C. being preferred. With other salt diluents present that lower the melting point, a temperature range of 325–500° C. is suitable, a range of 400–450° C. being preferred. The molten sulfide-sulfite-carbonate mixture sprayed from distributor 35 reacts with the carbon dioxide to regenerate the alkali metal carbonate and produce a gaseous mixture containing sulfur, usually with excess carbon dioxide. Molten alkali metal carbonate, including both regenerated and carrier carbonate, is collected in a sump 37 at the base of regenerator 33, from where it is fed by way of a conduit 38 by means of a pump 39 through a conduit 40 to storage vessel 4. The reconverted carbonate is then recycled to absorber unit 2 by way of conduit 5.

The sulfur-rich gas mixture, containing excess $CO_2$, produced in the regeneration reaction also may contain minor amounts of COS and $H_2O$. This mixture passes through a demister 41, which removes entrained liquid particles, and leaves regenerator 33 by way of a conduit 42 where it is fed to a separator-condenser unit 43. Sulfur is condensed in this unit and the $CO_2$ gas is returned by way of a conduit 44 for discharge to the atmosphere through stack 10.

The process shown in FIG. 2 describes the use of CO as regenerant gas, in contrast to the use of $CO_2$ shown in FIG. 1. The reduction reaction is essentially similar to that described for FIG. 1. Referring now to FIG. 2, the reductant gas mixture containing hydrogen and carbon monoxide is provided by synthesis gas plant 20 which enters the base of reducer 19 by way of a valved conduit 21. Similarly, the molten sulfite-carbonate mixture sprayed from distributor 18 reacts with the reductant gas, the sulfite being reduced to sulfide. The molten alkali metal sulfite-carbonate is collected in sump 22 at the base of reducer 19. The sulfite-carbonate mixture is pumped from sump 22 through a conduit 23 by way of a pump 24, then through a conduit 25 to a heat exchanger 26, where it loses heat.

The gas mixture produced in the reduction reaction with the synthesis gas consists principally of carbon dioxide and steam, similar to that shown in FIG. 1, in accordance with the previously shown equation, and will also contain minor amounts of other gaseous components as well as excess unreacted amounts of reducing gas. Referring to FIG. 2, the resultant gas mixture passes through a demister 27, which removes entrained liquid particles therefrom, the gas then leaving reducer 19 by way of a conduit 28. Where the exit gas mixture contains substantial amounts of unreacted hydrogen and carbon monoxide, along with formed carbon dioxide and steam, the mixture may be returned to reducer 19 for recycle in the reduction step by way of valved conduits 29 and 21.

Since in the process shown in FIG. 2 the regenerant gas utilized is carbon monoxide, the carbon dioxide and steam produced in the reduction reaction is not further utilized but is removed by way of a conduit 45 where it is discharged to the atmosphere after losing its sensible heat to heat exchangers 9. The carbon monoxide utilized in the reformation reaction may be obtained from synthesis plant 20 by first removing the hydrogen therefrom. Thus, the mixture of H₂ and CO is passed through a valved conduit 46, a hydrogen separator unit 47, a conduit 48, a condenser-desorber unit 31, which cools the gas to remove any water present, then through a heater unit 32 and enters the base of regenerator unit 33 by way of a conduit 34 at a temperature of 425±25° C.

The reformation reaction for the process of FIG. 2 then proceeds in a similar manner to that shown for FIG. 1, similar temperature conditions being utilized. Unreacted alkali metal sulfite in excess molten carbonate is similarly provided and it is mixed with alkali metal sulfide leaving heat exchanger 26, the molten sulfite-sulfide-carbonate mixture sprayed from distributor 35 reacting in a similar manner with the gas feed to regenerate molten alkali metal carbonate and form a gaseous mixture of sulfur and carbon dioxide. The recovery of sulfur is similar to that illustrated in FIG. 1.

The following examples illustrate the practice of the invention but are not intended to unduly limit its generally broad scope.

Example 1.—SO₂ absorption from flue gas

In one series of runs the feed gas consisted of CO₂ containing 0.1–20 vol. percent SO₂. The molten carbonate melt consisted of a ternary mixture of the carbonates of lithium, sodium, and potassium of approximately eutectic composition and was maintained at a temperature of about 500° C. The flow of SO₂ through the melt was varied from 1.5 to 24 cc./min. The inlet gas was preheated to about 400° C. before contacting the melt.

The final concentration of resultant alkali metal sulfite and molten carbonate varied from about 10 to 19.1 mole percent sulfite for feed gases having an initial concentration ranging from 1 to 18.2 vol. percent SO₂. Material balance analyses based on wet chemical analysis and gas chromatographic analysis together with continuous monitoring of the off flue gas show that more than 99.9% of the SO₂ content was removed from the simulated flue gas. The foregoing example substantially is that described in application Ser. No. 638,528.

Example 2.—Reduction of alkali metal sulfite by carbon

The reduction step of two-stage regeneration was evaluated according to the following equation:

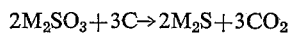

Two runs were made in pressure vessels using appropriate amounts of lithium, carbonate, potassium carbonate and sodium sulfite to form the molten carbonate eutectic upon complete regeneration. In one run a coconut shell charcoal was used as reducing agent, and in a second run green petroleum coke was used. The bombs were evacuated and inserted in a rocking furnace, and the rate of pressure build-up with time was followed. Both gas samples and the melt composition were analyzed. The reactions were carried out at 500° C., maximum pressure being obtained in less than one hour without rocking. The attained maximum pressure of 60–80 p.s.i.g. indicated about 15–25% completion of the reaction. Gas chromatographic analysis for both runs clearly indicated that the desired reaction had occurred, the gas being essentially 100% CO₂. Analysis of the melt confirmed that formation of M₂S had occurred. This carbon reduction process is essentially similar to that shown in copending application Ser. No. 638,365.

Example 3.—Pressurized reduction flow runs using hydrogen

A synthetic feedstock for reduction was prepared containing 14.1 wt. percent ternary alkali metal sulfite and the balance alkali metal carbonate. The melt temperature used was 650° C., hydrogen gas being bubbled through the melt under 10, 80, and 600 p.s.i.g. of reducing gas pressure. After two hours at 650° C., 60% of the sulfite was reduced under test conditions, the percentage conversion increasing to 85% at the end of four hours, being substantially complete at the end of eight hours. This example is essentially similar to that shown in copending application Ser. No. 638,529.

Example 4.—Pressurized reduction flow runs using carbon monoxide

Using the same sulfite feed stock shown in Example 3, a continuous flow reduction with CO was studied at a temperature of 610° C. for pressures of 15 and 80 p.s.i.g. at a CO flow rate of between 20 and 110 cc./min. At 80 p.s.i. and 610° C., the reaction was about 20% complete in one hour, 30–50% complete in two hours, and complete in about twelve hours. Melt analyses showed corresponding increases in content of formed sulfide. This example is essentially similar to that shown in copending application S.N. 638,529.

Example 5.—Reformation reaction using CO₂

A pressurized run was made in a stainless steel bomb which contained 10 gms. Li₂CO₃, 10 gms. K₂CO₃, 4 gms. Na₂SO₃, and 8 gms. Na₂S. The bomb was heated briefly to 500° C. and then cooled to 470° C. and CO₂ was bubbled through the melt. Analysis of the melt indicated that after three hours sulfur had been removed, the reaction being essentially complete in three hours. Thus the original composition of the melt containing 12.6 wt. percent oxidizable sulfur, after the run contained about 0.36 wt. percent oxidizable sulfur.

Example 6.—Reformation reaction using CO

A pressurized bomb run similar to that shown for Example 5 was performed using a mixture consisting of 10 gms. Li₂CO₃, 10 gms. K₂CO₃, 10 gms. Na₂SO₃, and 4 gms. Na₂S. After grinding together and melting in a test apparatus at 500° C., the temperature was lowered to 470° C., and CO was bubbled through the melt for 16 hours. Analysis of the melt showed a reduction of oxidizable sulfur from 12.2% to about 9%, indicating that the reaction was only 10% complete based upon the melt analysis.

Where H₂S is formed as the final product containing the sulfur values, as shown in copending application S.N. 638,528, S.N. 638,529, and S.N. 638,365, conversion to elemental sulfur for this H₂S feedstock requires treatment in a Claus reactor. The reformation step of the present process is particularly advantageous in that where sulfur is desired as the final product, it is evolved directly without necessity for proceeding through a Claus reactor.

It will, of course, be realized that many variations in reaction conditions can be used in the practice of this invention, depending in part upon the particular sulfur oxide content of the flue gas to be desulfurized, as well as the hydrocarbon or fossil fuel serving as the source of combustion gas. The term "hydrocarbon or fossil fuel" broadly indicates carbonaceous fuels, such as coal, oil-shale, petroleum, natural gas, and associated waste products, such as acid sludges and tars.

It will also be realized that many modifications may be made with respect to the present process that fall within the teachings thereof. For example, in the reduction step of the present process where only CO is used as the reducing gas, the following reaction occurs:

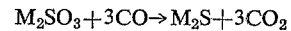

By performing the subsequent reformation step as a pressurized batch process, and retaining the generated CO₂, the same vessel may be used for both the reduction and reformation reactions. The temperature of the reactants is decreased by feeding M₂SO₃ to the reaction vessel at a lower temperature so that effectively a reaction between M₂S, M₂SO₃, and CO₂ will occur in accordance with the process illustrated in regenerator unit of FIG. 1.

Thus, while certain exemplary reactions have been described for the absorption and regeneration steps, it has been found, particularly with respect to the regeneration stage, that the actual mechanism of reaction is a highly complex one and several competing reactions may occur simultaneously. Therefore, to optimize each of the absorption and regeneration stages, varying reaction temperatures and pressure may be employed, as well as the use of catalysts and means for providing greater surface contact between the reductant and regenerant gases and the melts. Also, there may be employed a batch process or a continuous process, preferably the latter, with the usual provision for recycle of various unreacted or partially reacted components.

Further, even where the desired reactions do not go to completion and products are also produced by competing or undesired side reactions, the unreacted or undesired products may be recycled in the process without substantial interference with the basic absorption and regeneration stages. Thus, while the examples illustrating this invention have been described with respect to specific concentrations, times, temperatures, and other reaction conditions, the invention may be otherwise practiced, as will be readily apparent to those skilled in this art. Accordingly, this invention is not be be limited by the illustrative and specific embodiments thereof, but its scope should be determined in accordance with the claims thereof.

I claim:

1. In a process including an absorption stage and a two-stage regeneration for removing sulfur dioxide from hot combustion gas produced by burning a sulfur-containing hydrocarbon fuel where
    in the absorption stage the sulfur dioxide-containing combustion gas is contacted at a temperature of at least 350° C. with an initial molten salt mixture containing alkali metal carbonates as active absorbent for said sulfur dioxide to convert it to the sulfites of said alkali metals, and where
    in the two-stage regeneration comprising the sequential steps of reduction and reformation,
    in the reduction step the sulfite-containing molten salt obtained from said absorption stage is reacted under reducing conditions with a reducing agent to form alkali metal sulfide in the molten salt and a resultant gaseous mixture,
    in combination with the absorption stage and the reduction step, the improvement in the reformation step of the two-stage regeneration which comprises reacting the alkali metal sulfide-containing molten salt with alkali metal sulfite formed in the absorption reaction together with a gas selected from the class consisting of carbon dioxide, carbon monoxide, and mixtures thereof at a temperature below 500° C. at which said salt is molten to form elemental sulfur as a recoverable product and at the same time regenerate the alkali metal carbonates for recirculation in the process.

2. The process according to claim 1 wherein the reactant gas in the reformation step consists essentially of carbon monoxide.

3. The process according to claim 1 wherein the reactant gas in the reformation step consists essentially of carbon dioxide.

4. The process according to claim 1 wherein the resultant molten salt from the absorption stage contains about 10–30 mole percent alkali metal sulfite, the reducing step is performed at a temperature between 400 and 700° C., and the reformation step is performed at a temperature between 325 and 500° C.

5. The process according to claim 1 wherein the reformation step is performed at a temperature between 400 and 450° C.

6. The process according to claim 1 where at least a portion of the resultant gaseous mixture obtained from the reduction step is utilized as the reactant gas in the reformation step.

7. The process according to claim 1 where substantially all the reactant gas utilized in the reformation step is carbon dioxide obtained as a resultant gaseous product from the reduction step.

References Cited

UNITED STATES PATENTS

| | | | |
|---|---|---|---|
| 2,110,240 | 3/1938 | Roelen et al. | 23—3 |
| 2,177,707 | 10/1939 | Gaither | 23—225 |
| 2,299,149 | 10/1942 | Kemper | 23—3 |
| 3,111,377 | 11/1963 | Mugg | 23—48 |
| 3,148,950 | 9/1964 | Mugg | 23—224 |

OTHER REFERENCES

Bienstock et al.: Process Development in Removing Sulfur Dioxide from Hot Flue Gases; U.S. Bureau of Mines Report of Investigation No. 5735, 1961.

OSCAR R. VERTIZ, *Primary Examiner.*

G. O. PETERS, *Assistant Examiner.*

U.S. Cl. X.R.

23—134